UNITED STATES PATENT OFFICE.

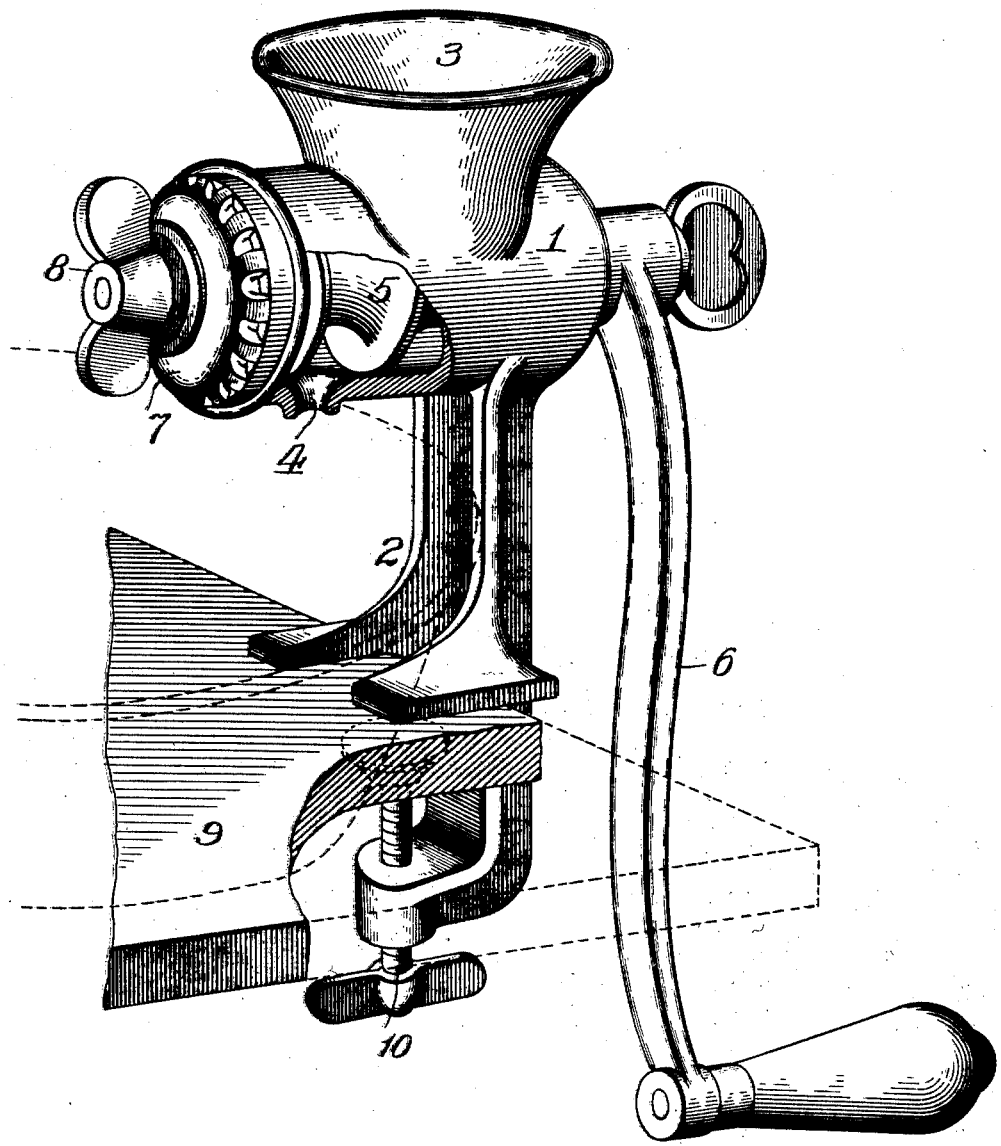

ELIZABETH M. BLAIR, OF CHICAGO, ILLINOIS.

MEAT-CHOPPER.

1,097,519.　　　　Specification of Letters Patent.　　Patented May 19, 1914.

Application filed May 3, 1912. Serial No. 694,930.

*To all whom it may concern:*

Be it known that I, ELIZABETH M. BLAIR, a citizen of the United States, residing at Chicago, county of Cook, and State of Illinois, have invented certain new and useful Improvements in Meat-Choppers, of which the following is a specification.

The present invention relates to a device for cutting or disintegrating meat and similar substances.

The object of the present invention is to provide a vent or discharge passage for the juices forced out of the substance which are being disintegrated, and to so arrange this passage as to allow of an easy discharge of said juices and to prevent a dripping of the juices at a point of the machine where they would be undesirable.

A further object of the invention is to so arrange the parts as to have the juices discharged at a point adjacent the point where the substance being treated is cut. And a further object of the invention is to provide a vent or discharge passage for the juices of a nature which will not become easily clogged or gummed, and so get into an unsanitary condition.

The invention further relates to the features of construction and combination of parts hereinafter described and claimed.

The drawing is a perspective of a food chopper embodying the subject matter of the present invention, a portion of the barrel of said chopper being broken away.

Referring to the drawing, the invention is shown as applied to a chopper having a barrel 1, which is usually of cylindrical formation. Said barrel has attached thereto a suitable supporting standard 2 adapted to be clamped against the table or other surface 9 by a suitable thumb-screw or other attaching means 10. The barrel is provided on its upper surface with a hopper 3 into which the material to be treated is placed. Within the barrel is located a suitable feeding worm 5 which is revolved through the medium of an operating handle 6. The front end of the barrel is closed by a cap 7 held in place by a suitable thumb-nut, or other securing means, 8. This cap 7 is provided with a series of perforations, and the front end of the worm 5 and the inner face of the cap constitute the fixed and movable cutting members for the material. This, however, is the usual and well-known construction of meat choppers of the class of the present invention. Located adjacent the front end of the worm 5 and adjacent the point where the cutting of the material takes place, is a nipple or boss 4 having an opening therethrough communicating with the interior of the barrel. This nipple constitutes the discharge opening or vent passage for the juices which are forced out of the meat or other substance during the cutting operation. By locating the discharge opening at the point indicated, the discharge of the juices takes place at a point in close proximity to the discharge of the substance being treated, and the receptacle which is positioned to receive the cut meat or other substance will receive the juices escaping through the discharge opening, and hence the provision for a separate trough or other means for carrying off the juices is eliminated. Moreover, the opening is of a sufficient substantial nature, whereby it will not become clogged or choked by the juices and hence the congealment of the juices will not take place around said opening, which would be highly objectionable from a sanitary standpoint, as well as preventing a proper discharge of the juices. By arranging the discharge opening at a point adjacent the cutters, the juices will be discharged at approximately the point of their liberation from the substance and will not be forced to travel backward against the pressure of the substance being fed forward by the worm. This will relieve the congestion at the point of cutting, making the cutting operation easier and more efficient. The vent or discharge opening described can be formed during the casting of the barrel, and requires no further machining or other operation than would ordinarily be required in the manufacture of the chopper. It, therefore, does not add to the cost of manufacture. On account of the vent at the front of the barrel, the juices are prevented from forcing their way backward in the barrel and escaping around the rear bearing of the worm feed. Such escapement is highly objectionable by reason of the fact that the juices will flow down the handle, making the device unsanitary and producing other objectionable features. The juices, obviously, could not escape through the openings in the cap 7 by reason of the fact that said openings are filled to their capacity by the substance forced out by the action of the worm feed.

I claim:

In a food chopper, the combination of a barrel having a smooth interior bore, a fixed cutter in the forward end of the barrel, a feeding screw for forcing material through the barrel, a movable cutting member on the forward end of the screw, the front of said barrel being provided with a discharge opening for the cut material and a spout fixedly secured in the bottom of the barrel and located in approximate alinement with the point of engagement of the fixed and movable cutters and providing a relatively unrestricted single vent opening for juices leading directly from the interior of the barrel adjacent the point of cutting and point of discharge of the material, the bottom of said barrel, save at the point where the discharge opening is located, being imperforate, substantially as described.

ELIZABETH M. BLAIR.

Witnesses:
A. H. MAUER,
G. A. LUNDIN.